(12) United States Patent
Tang et al.

(10) Patent No.: US 12,737,573 B2
(45) Date of Patent: Sep. 15, 2026

(54) RFID ANTENNA, RFID TAG AND RFID SYSTEM

(71) Applicant: Logistics and Supply Chain MultiTech R&D Centre Limited, Pok Fu Lam (HK)

(72) Inventors: Jing Jung Tang, Pok Fu Lam (HK); Leung Chiu, Pok Fu Lam (HK); Xiao Sheng Chen, Pok Fu Lam (HK)

(73) Assignee: Logistics and Supply Chain MultiTech R&D Centre Limited, Pok Fu Lam (HK)

( * ) Notice: Subject to any disclaimer, the term of this patent is extended or adjusted under 35 U.S.C. 154(b) by 15 days.

(21) Appl. No.: 18/899,087

(22) Filed: Sep. 27, 2024

(65) Prior Publication Data

US 2025/0094744 A1 Mar. 20, 2025

Related U.S. Application Data

(62) Division of application No. 18/193,989, filed on Mar. 31, 2023, now Pat. No. 12,197,991.

(51) Int. Cl.
*G06K 7/10* (2006.01)

(52) U.S. Cl.
CPC ..... *G06K 7/10356* (2013.01); *G06K 7/10346* (2013.01)

(58) Field of Classification Search
CPC ....................... G06K 7/10346; G06K 7/10356
See application file for complete search history.

(56) References Cited

U.S. PATENT DOCUMENTS

2003/0213849 A1* 11/2003 Luu ...................... G06K 19/077 235/492
2005/0275539 A1* 12/2005 Sakama ........... G06K 19/07756 343/700 R
2006/0267843 A1* 11/2006 Sakama ................. H01Q 9/285 343/700 MS
2008/0036608 A1* 2/2008 Sakama .......... G06K 19/07749 340/572.1
2009/0153303 A1* 6/2009 Forster .............. G06K 19/0724 340/10.1

* cited by examiner

*Primary Examiner* — Omer S Khan
(74) *Attorney, Agent, or Firm* — Renner Kenner Greive Bobak Taylor & Weber

(57) ABSTRACT

There is provided an antenna for a radio frequency identification (RFID) tag, which includes a loop antenna, an amplifying antenna, an additional antenna structure to modify impedance of the entire antenna. The additional antenna structure has a first electromagnetic coupling with the amplifying antenna and a second electromagnetic coupling with the loop antenna.

17 Claims, 9 Drawing Sheets

RFID ANTENNA, RFID TAG AND RFID SYSTEM

TECHNICAL FIELD

The present invention relates to a radio frequency identification (RFID) antenna, an RFID tag including the RFID antenna, and an RFID system including the RFID tag and an RFID reader. In particular, the present invention provides an RFID antenna, an RFID tag and an RFID system having an enhanced readable range. The present invention also provides a method for improving a reverse link in the RFID system.

BACKGROUND

A radio frequency identification (RFID) tag, sometimes known as an RFID transponder, is used in various industrial fields such as distribution and material management industries, and identification and security industries. In general, the RFID tag is used together with an RFID reader. For example, when an object on which the RFID tag is attached enters into a certain readable range, the RFID reader and the RFID tag exchange signals to identify desired information. A readable range of the RFID tag depends on a forward link (i.e., a communication channel of radio frequency signals from the RFID reader to the RFID tag) and a reverse link (a communication channel of radio frequency signals from the RFID tag to the RFID reader).

The greater the readable range, the more useful this can be, and perhaps the fewer the number of RFID readers needed. Thus it would be useful to provide an extended readable range for more efficient communications between the RFID tag and the RFID reader.

SUMMARY OF THE INVENTION

According to an aspect of the present invention, there is provided an antenna for a radio frequency identification (RFID) tag, which includes a loop antenna, an amplifying antenna, and an additional antenna structure to modify impedance of the entire antenna. The additional antenna structure has a first electromagnetic coupling with the amplifying antenna and a second electromagnetic coupling with the loop antenna.

In some embodiments, the loop antenna may be arranged on a first layer structure and the amplifying antenna may be arranged on a second layer structure. The first layer structure and the second layer structure can be detachably combined.

In some embodiments, the loop antenna and the amplifying antenna may be optimized for impedance matching to provide an increased readable range in a forward link.

In some embodiments, the first layer structure and the second layer structure may include a dielectric material.

In some embodiments, the loop antenna, the amplifying antenna and the additional antenna structure may include a metallic material.

In some embodiments, the first layer structure may be a form of a rectangular card and the second layer structure may be a form of a card holder which is configured to hold the card-shaped first layer structure.

In some embodiments, the amplifying antenna may be geometrically shaped.

In some embodiments, the amplifying antenna may be H-shaped.

In some embodiments, a geometry of the additional antenna structure may be optimized to enhance a reverse link.

In some embodiments, the additional antenna structure may include a metallic strip.

In some embodiments, the amplifying antenna may be H-shaped and the additional antenna structure may extend in a horizontal direction and be arranged between vertical elements of the H-shaped amplifying antenna.

In some embodiments, the additional antenna structure may be arranged between the vertical elements of the H-shaped amplifying antenna, with a gap between respective ends of the additional antenna structure and respective vertical elements of the amplifying antenna.

In some embodiments, a width of the gap and a width of the additional antenna structure may be optimized to enhance a reverse link.

In some embodiments, at least a part of the additional antenna structure may be overlapped with a part of the loop antenna.

In some embodiments, the first electromagnetic coupling and the second electromagnetic coupling may include capacitive coupling.

According to another aspect of the present invention, there is provided a radio frequency identification (RFID) tag, which includes the antenna as described above to receive an interrogation signal from a RFID reader and to transmit a response signal to said RFID reader, and a tag integrated circuit (IC) coupled with the antenna to generate the response signal in response to the interrogation signal.

In some embodiments, the tag IC may be mounted on the loop antenna.

According to yet another aspect of the present invention, there is provided a radio frequency identification (RFID) system, which includes the RFID tag as described above, and an RFID reader to read information from the RFID tag.

According to yet another aspect of the present invention, there is provided a method for improving a reverse link in a radio frequency identification (RFID) system including a RFID reader and a RFID tag. The method includes providing an antenna of the RFID tag, the antenna including a loop antenna and an amplifying antenna which are detachably combined, providing an additional antenna structure to the amplifying antenna to modify impedance of the entire antenna of the RFID tag, and optimizing a geometry of the additional antenna structure to obtain a desired impedance of the entire antenna.

In some embodiments, providing the antenna of the RFID tag may include providing the loop antenna on a first layer structure, and providing the amplifying antenna on a second layer structure.

In some embodiments, providing the additional antenna structure may include providing a metallic strip to the amplifying antenna on the second layer structure.

In some embodiments, providing the amplifying antenna may include providing an H-shaped amplifying antenna, and providing the metallic strip may include providing the metallic strip to extend in a horizontal direction and to be arranged between vertical elements of the H-shaped amplifying antenna.

In some embodiments, providing the metallic strip may include providing the metallic strip between vertical elements of the H-shaped amplifying antenna, leaving a gap between respective ends of the metallic strip and respective vertical elements of the amplifying antenna.

In some embodiments, optimizing the geometry of the additional antenna structure may include optimizing a width of the gap and a width of the metallic strip.

Other features and aspects of the invention will become apparent by consideration of the following detailed description, drawings and claims.

Before any independent constructions of the invention are explained in detail, it is to be understood that the invention is not limited in its application to the details of construction and the arrangement of components set forth in the following description or illustrated in the following drawings. The invention is capable of other independent constructions and of being practiced or of being carried out in various ways. Also, it is to be understood that the phraseology and terminology used herein is for the purpose of description and should not be regarded as limiting.

Use of “including” and “comprising” and variations thereof as used herein is meant to encompass the items listed thereafter and equivalents thereof as well as additional items. Use of “consisting of” and variations thereof as used herein is meant to encompass only the items listed thereafter and equivalents thereof.

BRIEF DESCRIPTION OF DRAWINGS

These and other features of the invention will become more apparent from the following description, by way of example only, with reference to the accompanying drawings, in which:

FIG. 3(*b*) is a perspective view of an RFID tag including a combined structure of a first layer structure and a second layer structure, according to an embodiment of the present invention;

DETAILED DESCRIPTION OF PREFERRED EMBODIMENTS

Hereinafter, embodiments of the present disclosure will be described in more detail with reference to the drawings.

Figure 1:
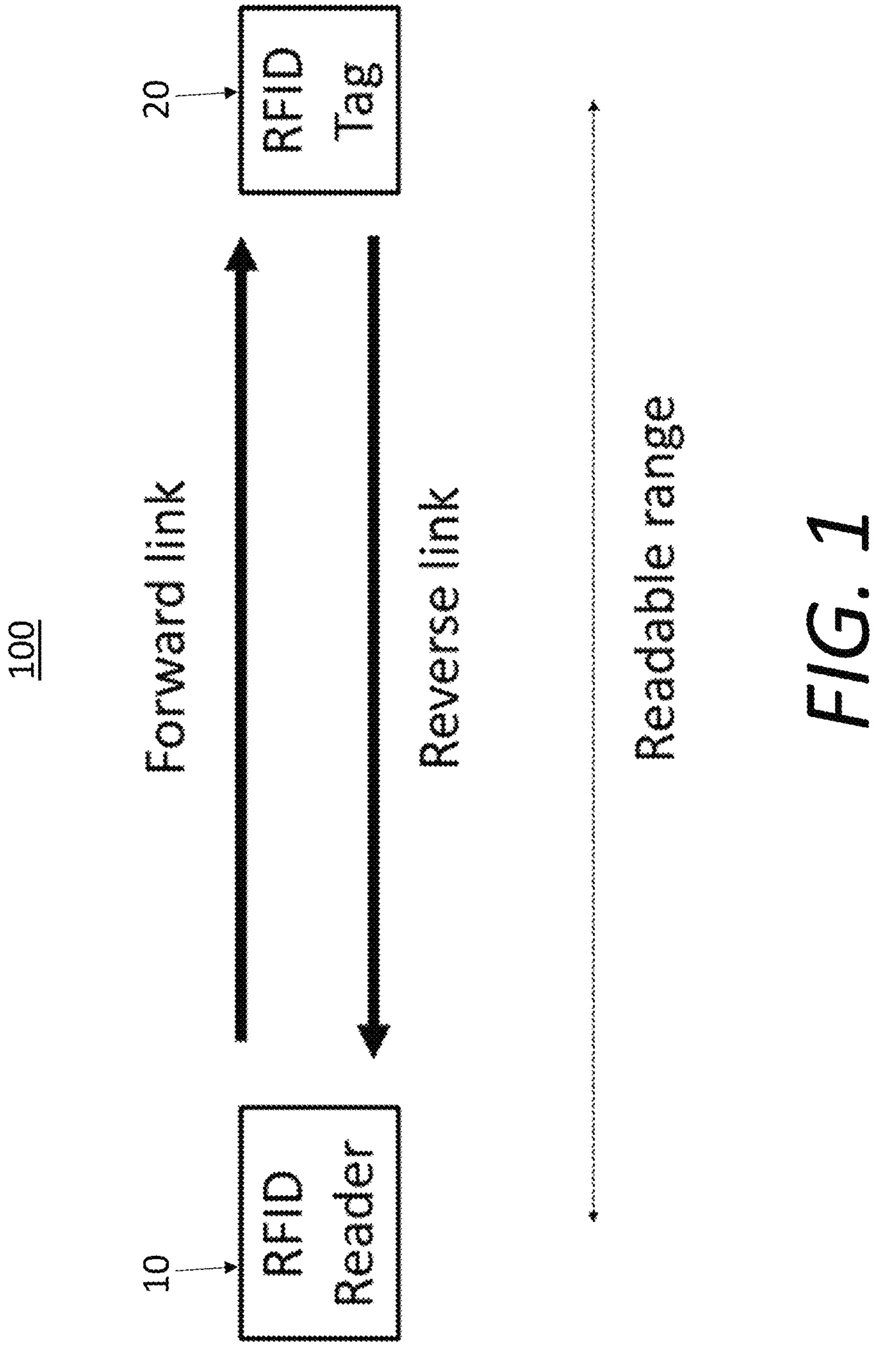
FIG. 1 is a schematic diagram of an RFID system according to an embodiment of the present invention.

FIG. 1 is a schematic diagram illustrating a radio frequency identification (RFID) system 100 according to an embodiment of the present invention. The RFID system 100 includes an RFID reader 10 and an RFID tag 20. The RFID tag 20 is configured to be attached to an object under management or otherwise of interest. Within a readable range in the RFID system 100, if the RFID reader 10 transmits an interrogation signal to the RFID tag 20, the RFID tag 20 transmits back a response signal, which is a back-scattering modulated signal to provide information stored in the RFID tag 20. The back-scattering modulation can be performed based on any known method for transmitting tag information, e.g. by modulating an amplitude and/or a phase of a scattered electromagnetic wave in response to an electromagnetic wave initially transmitted from the RFID reader 10. The interrogation signal and the response signal can be a radio frequency (RF) signal. A forward link is a communication channel of radio frequency signals from the RFID reader 10 to the RFID tag 20, and a reverse link is a communication channel of radio frequency signals from the RFID tag 20 to the RFID reader 10. A readable range can be referred as a range between the RFID reader 10 and the RFID tag 20, within which the RFID reader 10 can read information stored in the RFID tag 20 in the RFID system 100.

The RFID tag 20 includes an antenna and a tag integrated circuit (IC). The antenna of the RFID tag 20 is configured to receive the interrogation signal from the RFID reader 10 and transmit the response signal to the RFID reader 10. The tag IC is configured to store information and to modulate signals for transmitting as the response signal. In order to maximize the readable range, one needs to ideally match the impedance of the RFID tag 20's antenna to the tag IC utilized in the RFID tag 20. Therefore, the antenna of the RFID tag 20 is designed based on the impedance of the tag IC.

Figure 2:
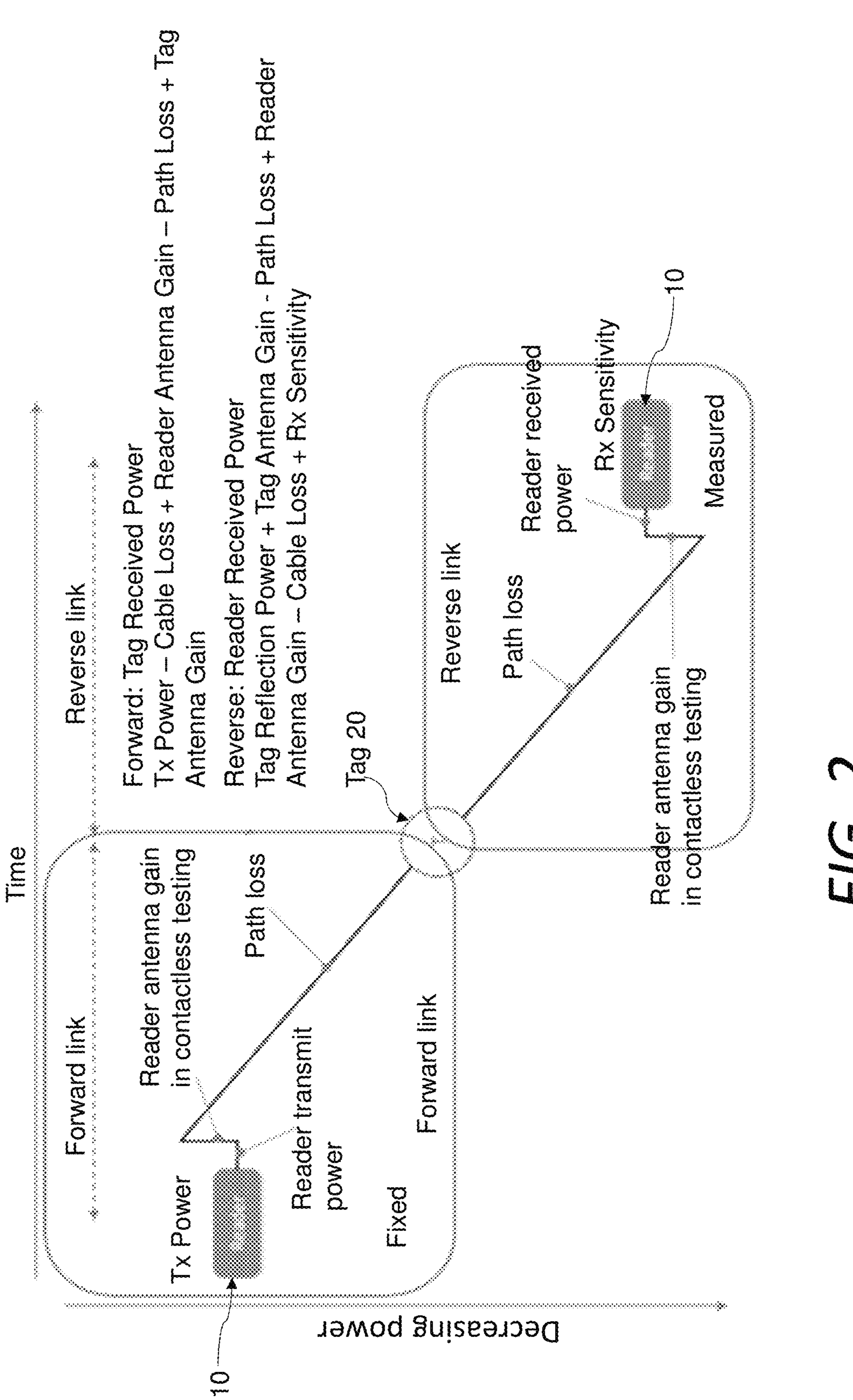
FIG. 2 shows a readable range of an RFID tag depending on a forward link and a reverse link.

FIG. 2 is a graph showing a readable range of the RFID system 100 depending on the forward link and the reverse link. The line between the RFID reader 10 and the RFID tag 20 shows the relationship between the power and the time. X-axis shows a sequence of events according to the time and y-axis shows the power. The readable range is related to a tag received power, which is a signal power received in the RFID tag 20 in the forward link and a reader received power, which is a signal power received in the RFID reader 10 in the reverse link. For the forward link, the RFID reader 10 transmits a signal power out, and the signal power passes through a cable and RFID reader's antenna, and is wirelessly transmitted to the RFID tag 20. The sensitivity of the RFID tag 20 should be more sensitive than the power it receives, and therefore the readable range is limited by the sensitivity of the RFID tag 20 for the forward link. For the forward link, the tag received power can be obtained in consideration of a transmitting power (Tx power), cable loss, reader antenna gain, path loss and tag antenna gain as below.

$$\text{Tag Received Power} = \text{Tx Power} - \text{Cable Loss} + \text{Reader Antenna Gain} - \text{Path Loss} + \text{Tag Antenna Gain}$$

For the reverse link, the RFID tag 20 transmits back a response signal with data to the RFID reader 10. The response signal from the RFID tag 20 is wirelessly transmitted to RFID reader's antenna and passes through the cable and is read by the RFID reader 10. The receiving sensitivity of the RFID reader 10 should be more sensitive than the power it receives, and therefore the readable range is limited by the receiving sensitivity of the RFID reader 10. For the reverse link, the reader received power can be obtained in consideration of tag reflection power, tag antenna gain, path loss, reader antenna gain, cable loss and receiving sensitivity (Rx sensitivity) as below.

$$\text{Reader Received Power} = \text{Tag Reflection Power} + \text{Tag Antenna Gain} - \text{Path Loss} + \text{Reader Antenna Gain} - \text{Cable Loss} + \text{Rx Sensitivity}$$

The antenna structure/design is provided such that the sensitivity of the RFID tag 20 and the receiving sensitivity of the RFID reader 10 are balanced.

The antenna of the RFID tag 20 with full impedance matching results in the maximum forward link budget. In this regard, antenna structure/design can be provided based on impedance matching with an RFID tag radio frequency port.

Figure 3A:
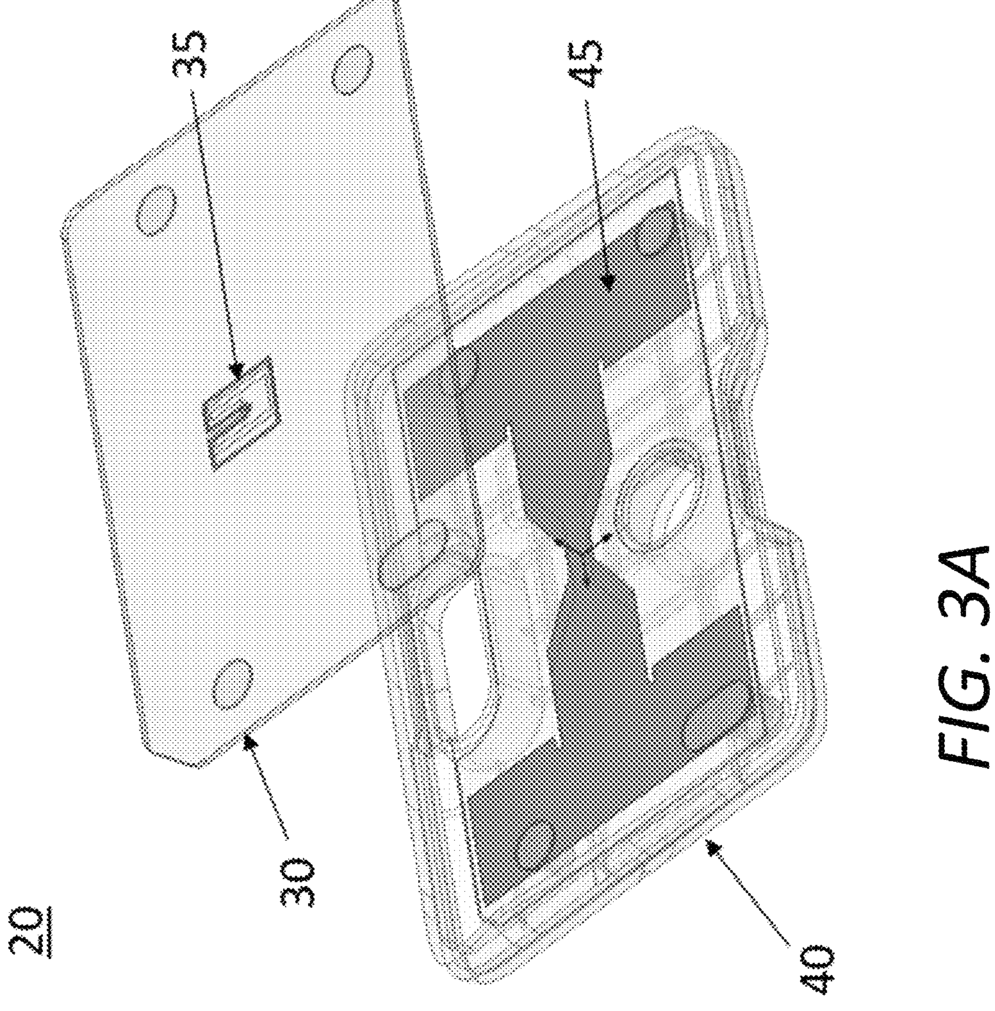
FIG. 3(*a*) is a perspective view of an RFID tag including a separated structure of a first layer structure and a second layer structure, according to an embodiment of the invention.
Figure 3B:
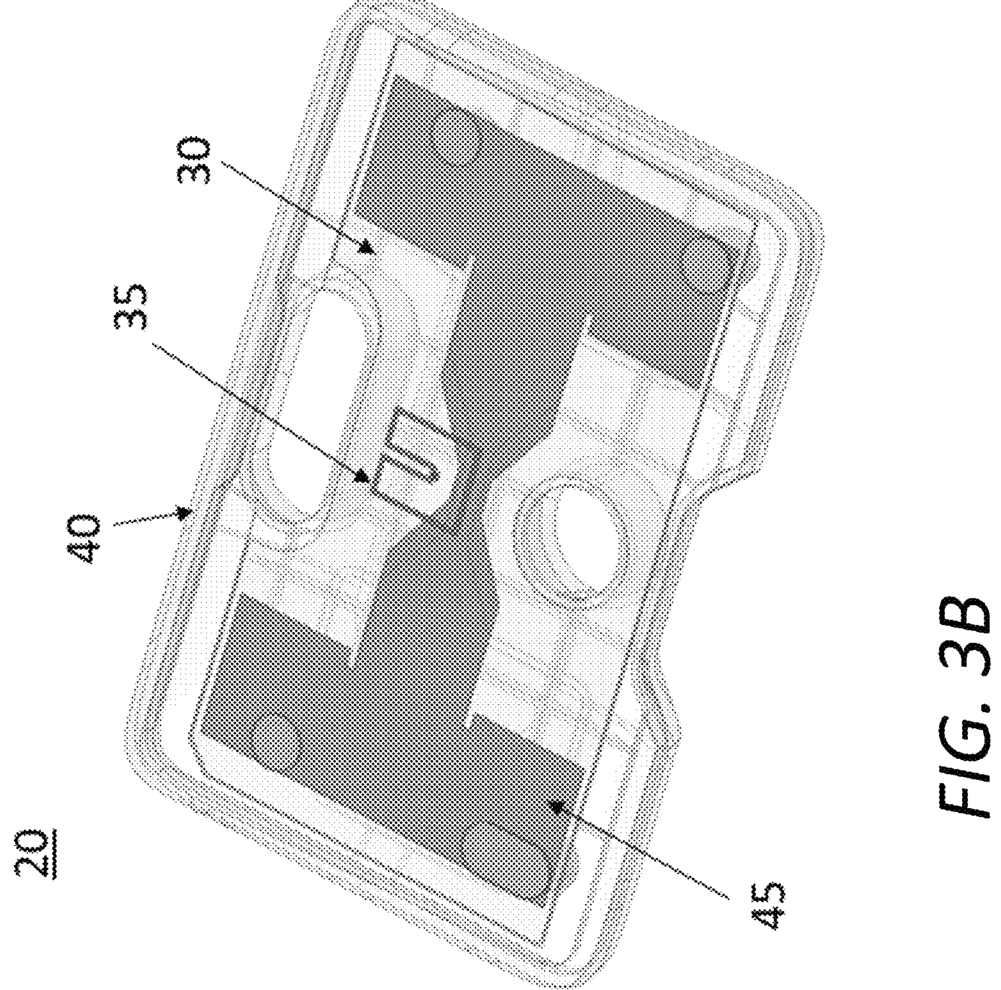

FIG. 3(*a*) and FIG. 3(*b*) illustrate an RFID tag 20 including a first layer structure 30 and a second layer structure 40 according to an embodiment of the present invention. FIG. 3(*a*) shows a separated structure of the first layer structure 30 and the second layer structure 40 while FIG. 3(*b*) shows a combined structure of the first layer structure 30 and the second layer structure 40.

Figure 4:
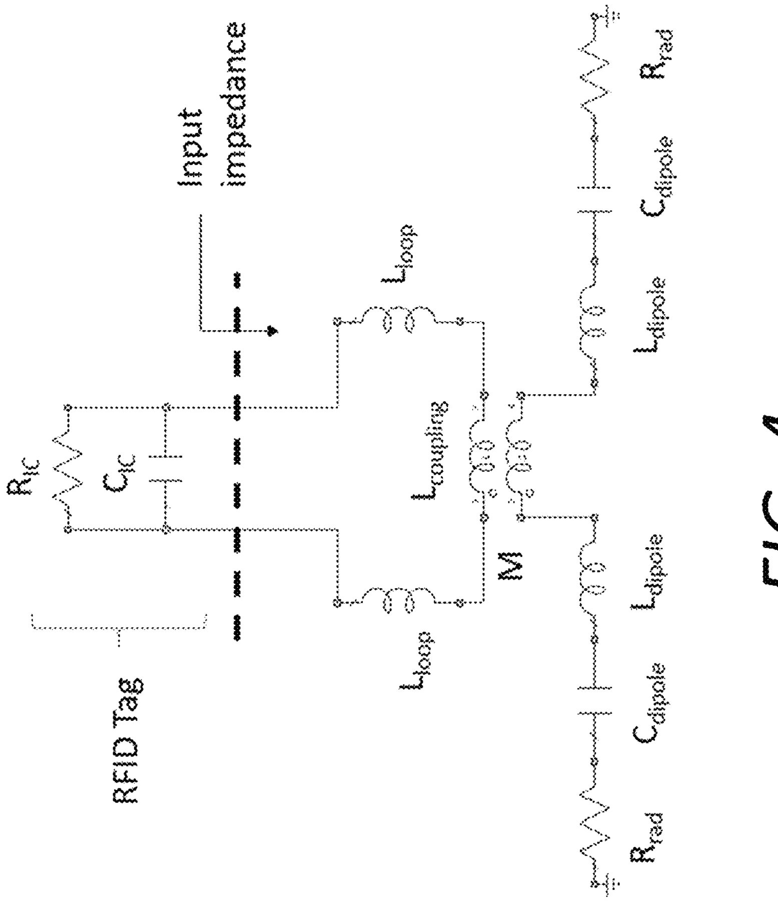
FIG. 4 shows an example equivalent circuit corresponding to the RFID tag, according to an embodiment of the present invention.

The antenna of the RFID tag 20 is provided by a coupling structure of a loop antenna 35 arranged on the first layer structure 30 and an amplifying antenna 45 arranged on the second layer structure 40. Improved impedance matching can be achieved from the geometry of the loop antenna 35 and the amplifying antenna 45 and the shape of the amplifying antenna 45. The geometry of the RFID tag 20 can be represented by the equivalent circuit as shown in FIG. 4. Here, $R_{IC}$ and $C_{IC}$ and the equivalent circuit of RFID tag IC can be found in the known datasheet. $L_{loop}$ is the equivalent inductance of the loop antenna 35 connecting the RFID tag. $L_{coupling}$ and M are the equivalent self and mutual inductances of the overlapping area of the amplifying antenna 45. $L_{dipole}$ and $C_{dipole}$ are the equivalent inductance and capacitance of the amplifying antenna 45 respectively. $R_{rad}$ is the radiation resistance of the amplifying antenna 45.

All elements in the equivalent circuit depend on the geometry of both the loop antenna 35 and the amplifying antenna 45 in the RFID tag 20 and the materials of the first layer structure 30 and the second layer structure 40.

Based on the equivalent circuit shown in FIG. 4, input impedance ($Z_{in}$) can be represented as below.

$$\text{Input impedance } Z_{\text{in}} = j\omega 2L_{loop} + j\omega L_{coupling} + j\omega M + \frac{\omega^2 M^2}{j\omega L_{coupling} + j\omega 2L_{dipole} + \dfrac{2}{j\omega C_{dipole}} + 2R}$$

Further, impedance matching condition is provided as below.

$$\frac{R_{IC}\dfrac{1}{j\omega C_{IC}}}{R_{IC} + \dfrac{1}{j\omega C_{IC}}} = Z_{\text{in}}^*$$

As all elements in the equivalent circuit depend on the geometry of both the loop antenna 35 and the amplifying antenna 45 in the RFID tag 20 and the materials of the first layer structure 30 and the second layer structure 40, there are many combinations of geometry that can achieve desired impedance matching. By tuning and optimizing the geometry, desired impedance matching should be achieved over certain frequency ranges but not just a single frequency point. The reason of trials over certain frequency ranges is to compensate the fabrication tolerance of all unexpected results such as metal loss, dielectric loss, material model error, fabrication error etc.

In an embodiment, the first layer structure 30 may be formed as a sheet. For example, the first layer structure 30 may be a form of a rectangular card. The loop antenna 35 can be arranged on an upper-middle part of the first layer structure 30 as shown in FIG. 3(*a*). The first layer structure 30 may include a dielectric layer. The loop antenna 35 may include a metallic material and is inlaid in (or on) the first layer structure 30. The tag IC (not shown) can be mounted on the loop antenna 35. The dielectric material for the first layer structure 30 is supporting material for the loop antenna 35 and can be chosen to have a well-defined dielectric constant for the antenna structure/design.

In an embodiment, the second layer structure 40 is provided to be laminated with the first layer structure 30. For example, the second layer structure 40 may be a form of a card holder which can hold the card-shaped first layer structure 30 as shown in FIG. 3(*a*). The second layer structure 40 may include a dielectric layer. The amplifying antenna 45 may include a metallic material and is arranged on the second layer structure 40. The first layer structure 30 having the loop antenna 35 and the tag IC and the second layer structure 40 having the amplifying antenna 45 are detachably combined to form the RFID tag 20. The dielectric material for the second layer structure 40 is supporting material for the amplifying antenna 45 and can be chosen to have a well-defined dielectric constant for the antenna structure/design.

The amplifying antenna 45 can be geometrically designed for the entire structure (i.e., when the first layer structure and the second layer structure is combined) to meet desired impedance matching for the tag IC. For example, the amplifying antenna 45 may include an H-shaped metallic structure. The-H shaped metallic structure 45 contributes to extend a readable range in the forward link between the RFID reader 10 and the RFID tag 20. The geometry of the amplifying antenna 45 can enhance the readable range in the forward link. For example, the H-shaped metallic structure as the amplifying antenna 45 has an improved antenna gain which can enhance the power received by the RFID tag 20.

For the reverse link, when the RFID tag 20 receives enough RF power, it transmits back a modulated signal to the RFID reader 10 based on a reverse link budget. The reverse link (i.e., back scattering power) depends on the antenna design and the sensitivity of the RFID reader 10. As the sensitivity of the RFID reader 10 is a fixed parameter and it is not easily changeable due to infrastructure issues, the options for improving the reverse link power include antenna design or changing the tag IC. The present invention relates to the antenna design. Hereinafter, a modified amplifying antenna to enhance transmitting performance will be described with reference to FIG. 5.

Figure 5:
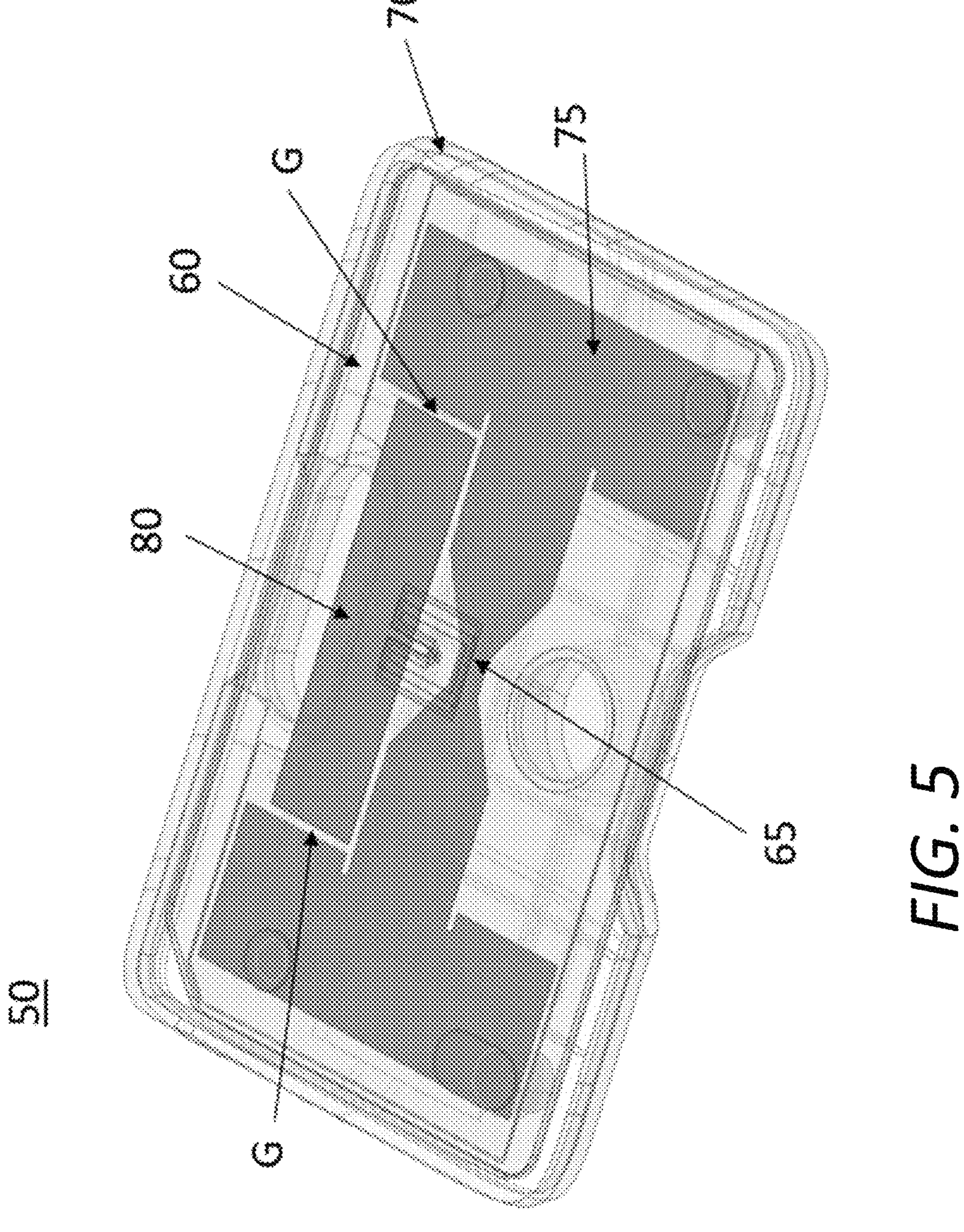
FIG. 5 is a perspective view of an RFID tag including a modified antenna structure, according to an embodiment of the present invention.

FIG. 5 illustrates an RFID tag 50 including a modified amplifying antenna design according to an embodiment of the present invention. The RFID tag 50 includes a first layer structure 60 and a second layer structure 70 which are detachably combined similarly to the RFID tag 20 shown in FIG. 3(*a*) and FIG. 3(*b*). Also, a loop antenna 65 and an amplifying antenna 75 are arranged on the first layer structure 60 and the second layer structure 70, respectively, similarly to the loop antenna 35 and the amplifying antenna 45 shown in FIG. 3(*a*) and FIG. 3(*b*).

The RFID tag 50 in FIG. 5 is different from the RFID tag 20 in FIG. 3(*a*) and FIG. 3(*b*) in that an additional antenna structure 80 is further provided on the second layer structure 70 to modify an amplifying antenna structure. For example, the additional antenna structure 80 is further provided to the amplifying antenna 75 to provide a modified amplifying antenna structure. A geometry of the additional antenna structure 80 can be optimized to enhance the reverse link. The reverse link is proportional to the scattered power generated by the RFID tag 20. The scattered power depends on the input impedance. That is, the smaller the input resistance is, the larger the scattered power is generated. The input resistance can be reduced because of the additional antenna structure 80 added to the amplifying antenna 75. For example, the additional antenna structure 80 may be a metallic strip which extends in a horizontal direction and is arranged between vertical elements of the H-shaped amplifying antenna 75. The metallic strip 80 does not physically contact the H-shaped amplifying antenna 75 at any of its both ends. The metallic strip 80 is arranged between vertical elements of the H-shaped amplifying antenna 75, leaving a gap (G) between the respective end of the metallic strip 80 and the respective vertical element of the amplifying antenna 75. The gap (G) provides capacitive coupling which can reduce the input resistance. The width of the gap (G) can be optimized to obtain desired input resistance.

In addition, the additional metallic strip 80 is arranged to be able to couple with the loop antenna 65 with optimized line-width for electromagnetic coupling with the loop antenna 65 which is arranged on the first layer structure 60. For example, as shown in FIG. 5, the additional metallic structure 80 is arranged in an upper part of the second layer structure 70 such that at least a part of the loop antenna 65 can be overlapped with a part of the additional metallic structure 80 for the electromagnetic coupling, i.e., capacitive coupling. The width of the metallic strip 80 can be optimized to adjust electromagnetic characteristics for the coupling between the metallic strip 80 and the loop antenna 65. Because of the additional metallic structure 80 bringing about the edge electromagnetic coupling with the amplifying antenna 75 and the broadside electromagnetic coupling with the loop antenna 65, the electromagnetic characteristics of the entire antenna can be changed, and thus, the impedance of the entire antenna can be changed. By optimizing the width of the gap (G) between the metallic strip 80 and the amplifying antenna 75 and the width of the metallic strip 80 in multiple trials, desired scattered power can be obtained. This modified antenna structure can enhance the output power of the tag IC. In other words, the reverse link is enhanced.

Figure 6:
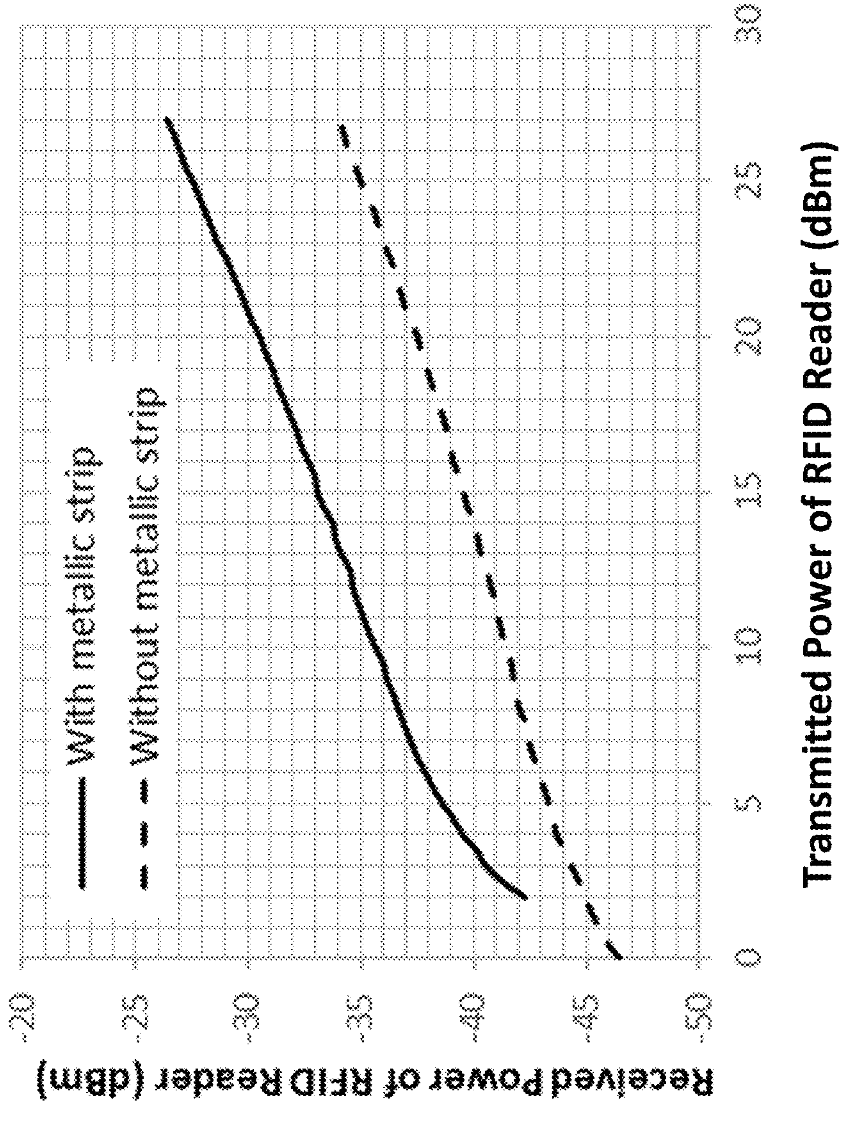
FIG. 6 is a graph showing power characteristics of an RFID tag, according to an embodiment of the present invention.
Figure 7:
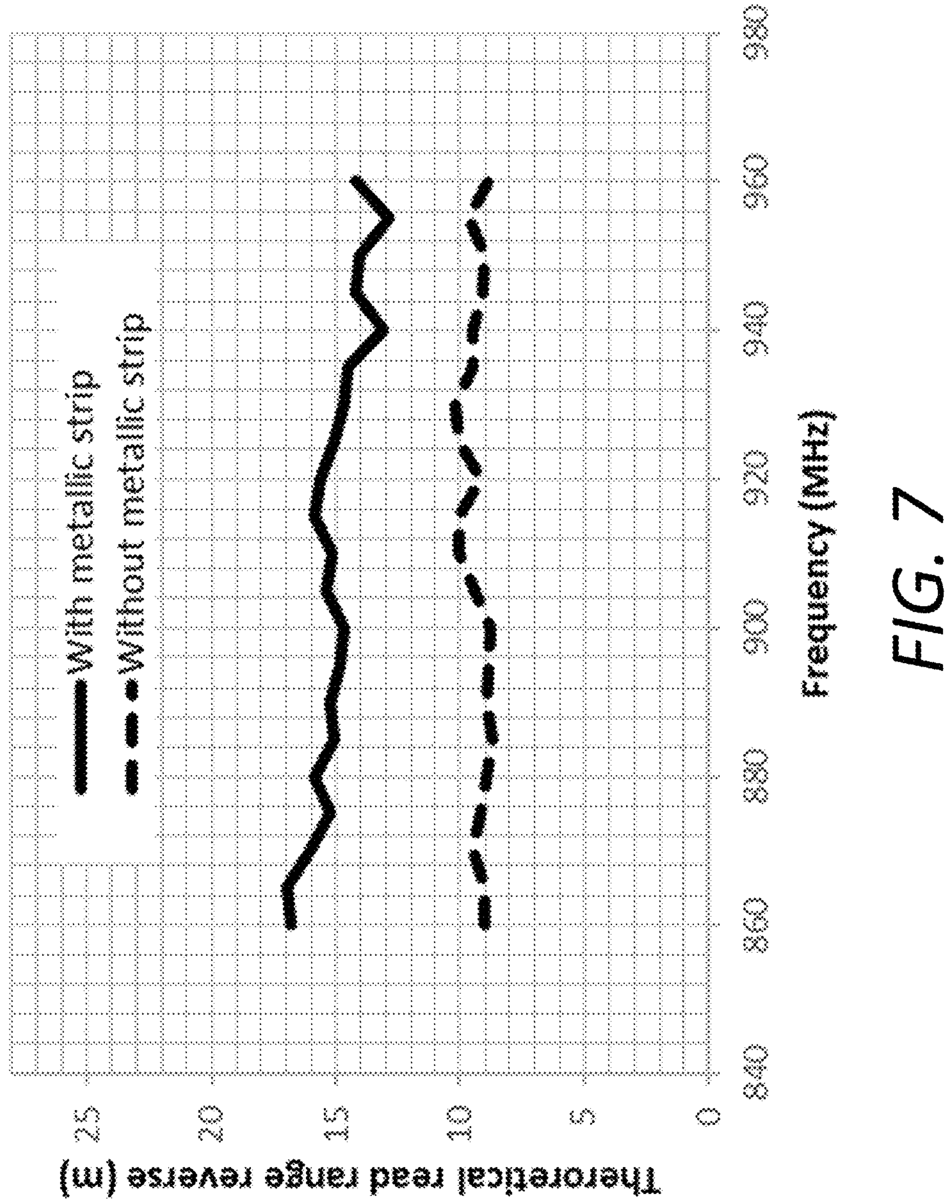
FIG. 7 is a graph showing reverse link distances of an RFID tag, according to an embodiment of the present invention.

A reference reader can be used to measure enhancement of the reverse link. FIG. 6 shows the relationship between a transmitted power of a RFID reader and a received power of a RFID reader, comparing antenna structures with and without the additional antenna structure 80. As indicated in FIG. 6, the RFID tag 50 with the additional antenna structure 80 shows higher output power. FIG. 7 shows reverse link distances comparing antenna structures with and without the additional antenna structure 80. As indicated, the antenna structure with the additional antenna structure 80 shows a greater readable range.

Even though not described in detail, the RFID tag 20 or 50 includes a substrate which is a carrier of the antenna and the tag IC. Magnets and/or iron plates can be used for antenna material to provide improved electromagnetic characteristics.

According to the embodiments of the present invention, the antenna of the RFID tag 20, 50 is provided by a coupling structure of the loop antenna 35, 65 arranged on the first layer structure 30, 60 and the amplifying antenna 45, 75 arranged on the second layer structure 40, 70. The first layer structure 30, 60 supporting the loop antenna 35, 65 and the second layer structure 40, 70 supporting the amplifying antenna 45, 75 can be detachably combined to form the tag antenna. This allows the antenna coupling from a smaller antenna structure, i.e., inlay inside the card form of the first layer structure (i.e., credit card size) to the amplifying antenna on the card holder form of the second layer structure to extend a readable range. The inlay inside the card can be manufactured to contain little metal content for better card manufacturing process, while the amplifying antenna arranged on the holder can make the whole antenna to a larger size so that more power can be delivered.

According to the embodiments of the present invention, enhancement of the reverse link is provided by the additional antenna structure. The geometry of the amplifying antenna (i.e., H-shaped metallic antenna structure) enhances the readable range in the forward link, as the antenna gain can enhance the power received by the RFID tag, and the existence of the additional antenna structure (i.e., metallic strip) enhances the readable range in the reverse link, as the metallic strip can change the input impedance, which can enhance the RFID tag's output power.

According to another aspect of the invention, it is provided a method for improving a reverse link in a radio frequency identification (RFID) system including a RFID reader and a RFID tag. In some embodiments, the RFID tag may include the RFID tag 20 as described with reference to FIG. 3(*a*) and FIG. 3(*b*) or the RFID tag 50 as described with reference to FIG. 5. The RFID system may include the RFID system 100 as described with reference to FIG. 1.

Figure 8:
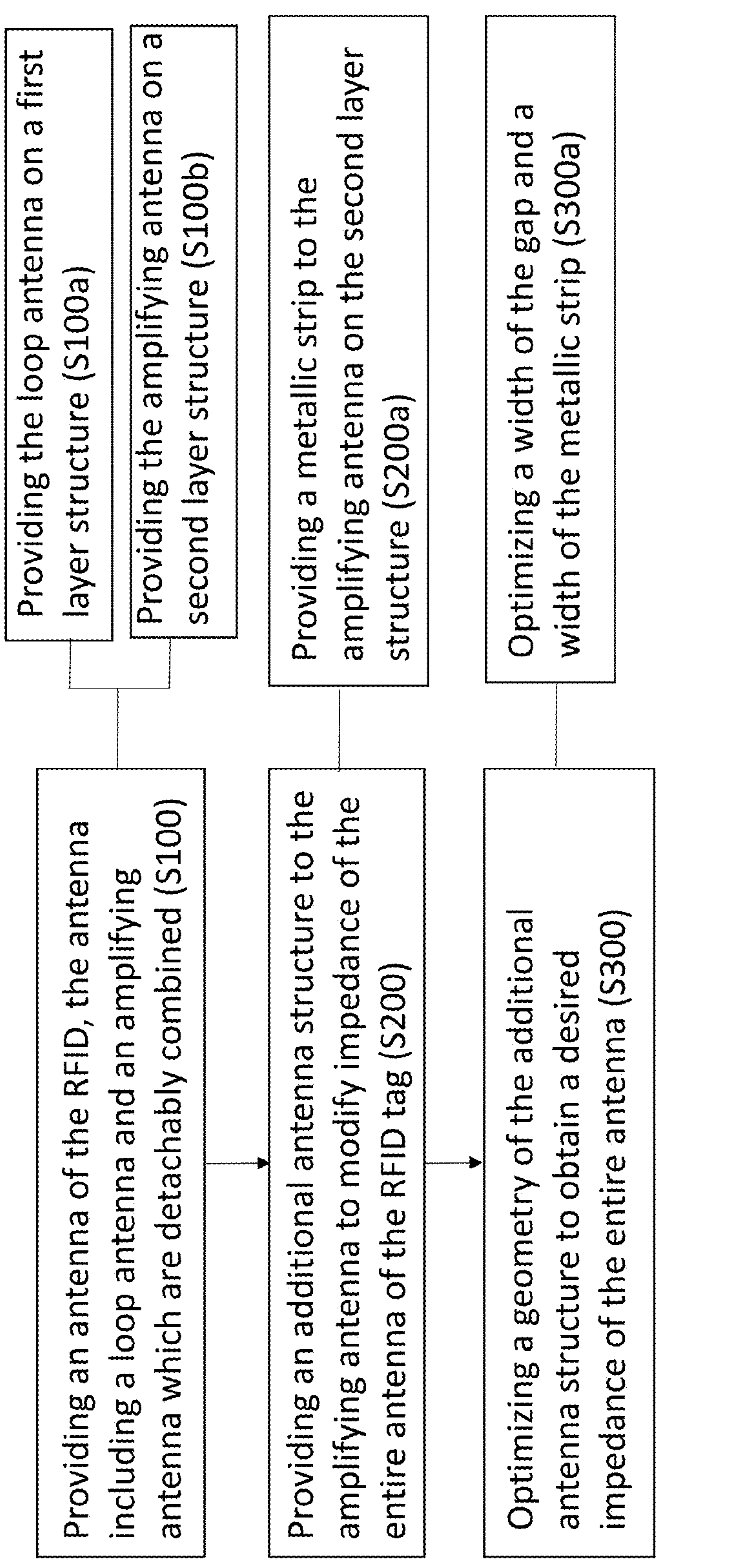
FIG. 8 is a flow chart showing a method for improving a reverse link in the RFID system, according to an embodiment of the present invention.

With reference to FIG. 8, the method includes providing an antenna of the RFID tag, the antenna including a loop antenna and an amplifying antenna which are detachably combined (S100), providing an additional antenna structure to the amplifying antenna to modify impedance of the entire antenna of the RFID tag (S200), and optimizing a geometry of the additional antenna structure to obtain a desired impedance of the entire antenna (S300).

In an embodiment, providing the antenna of the RFID tag (S100) may include providing the loop antenna on a first layer structure (S100*a*), and providing the amplifying antenna on a second layer structure (S100*b*). The amplifying antenna may be an H-shaped amplifying antenna. The first layer structure and the second layer structure can be combined to form the antenna of the RFID tag.

In an embodiment, providing the additional antenna structure (S200) may include providing a metallic strip to the amplifying antenna on the second layer structure (S200*a*). The metallic strip may be provided to extend in a horizontal direction and to be arranged between vertical elements of the H-shaped amplifying antenna.

In an embodiment, providing the metallic strip (S200*a*) may include providing the metallic strip between vertical elements of the H-shaped amplifying antenna, leaving a gap between respective ends of the metallic strip and respective vertical elements of the amplifying antenna.

In an embodiment, optimizing the geometry of the additional antenna structure (S300) may include optimizing a width of the gap and a width of the metallic strip (S300*a*).

It should be understood that the above only illustrates and describes examples whereby the present invention may be carried out, and that modifications and/or alterations may be made thereto without departing from the spirit and scope of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided or separately or in any suitable sub-combination.

The invention claimed is:

1. An antenna for a radio frequency identification (RFID) tag, comprising:

a loop antenna;

an amplifying antenna; and an additional antenna structure to modify impedance of the antenna of the RFID tag, wherein the additional antenna structure has a first capacitive coupling with the amplifying antenna and a second capacitive coupling with the loop antenna, wherein the loop antenna is arranged on a first layer structure and the amplifying antenna is arranged on a second layer structure, wherein the first layer structure and the second layer structure are detachably combined, wherein the additional antenna structure is arranged on the second layer structure in a way that the additional antenna structure does not physically contact the amplifying antenna.

2. The antenna of claim 1, wherein the loop antenna and the amplifying antenna are optimized for impedance matching to provide an increased readable range in a forward link.

3. The antenna of claim 1, wherein the first layer structure and the second layer structure comprise a dielectric material.

4. The antenna of claim 1, wherein the loop antenna, the amplifying antenna and the additional antenna structure comprise a metallic material.

5. The antenna of claim 1, wherein the first layer structure is a form of a rectangular card and the second layer structure is a form of a card holder which is configured to hold the card-shaped first layer structure.

6. The antenna of claim 1, wherein the amplifying antenna is geometrically shaped.

7. The antenna of claim 6, wherein the amplifying antenna is H-shaped.

8. The antenna of claim 1, wherein a geometry of the additional antenna structure is optimized to enhance a reverse link.

9. The antenna of claim 1, wherein the additional antenna structure comprises a metallic strip.

10. The antenna of claim 1, wherein the amplifying antenna is H-shaped and the additional antenna structure extends in a horizontal direction and is arranged between vertical elements of the H-shaped amplifying antenna.

11. The antenna of claim 10, wherein the additional antenna structure is arranged between the vertical elements of the H-shaped amplifying antenna, with a gap between respective ends of the additional antenna structure and respective vertical elements of the amplifying antenna.

12. The antenna of claim 11, wherein a width of the gap and a width of the additional antenna structure are optimized to enhance a reverse link.

13. The antenna of claim 1, wherein at least a part of the additional antenna structure is overlapped with a part of the loop antenna.

14. A method for improving a reverse link in a radio frequency identification (RFID) system including a RFID reader and a RFID tag, comprising:

providing an antenna of the RFID tag, comprising providing a loop antenna on a first layer structure, and providing an amplifying antenna on a second layer structure, wherein the antenna includes the loop antenna and the amplifying antenna which are detachably combined;

providing an additional antenna structure as a metallic strip to the amplifying antenna on the second layer structure to modify impedance of the entire antenna of the RFID tag; and optimizing a geometry of the additional antenna structure to obtain a desired impedance of the entire antenna.

15. The method of claim 14, wherein providing the amplifying antenna comprises providing an H-shaped amplifying antenna, and providing the metallic strip comprises providing the metallic strip to extend in a horizontal direction and to be arranged between vertical elements of the H-shaped amplifying antenna.

16. The method of claim 15, wherein providing the metallic strip comprises providing the metallic strip between vertical elements of the H-shaped amplifying antenna, leaving a gap between respective ends of the metallic strip and respective vertical elements of the amplifying antenna.

17. The method of claim 16, wherein optimizing the geometry of the additional antenna structure comprises optimizing a width of the gap and a width of the metallic strip.

* * * * *